May 8, 1951  R. M. HUEY  2,551,743
AUTOMATIC EMERGENCY BRAKE RELEASE FOR MOTOR VEHICLES
Filed March 4, 1948  2 Sheets-Sheet 1
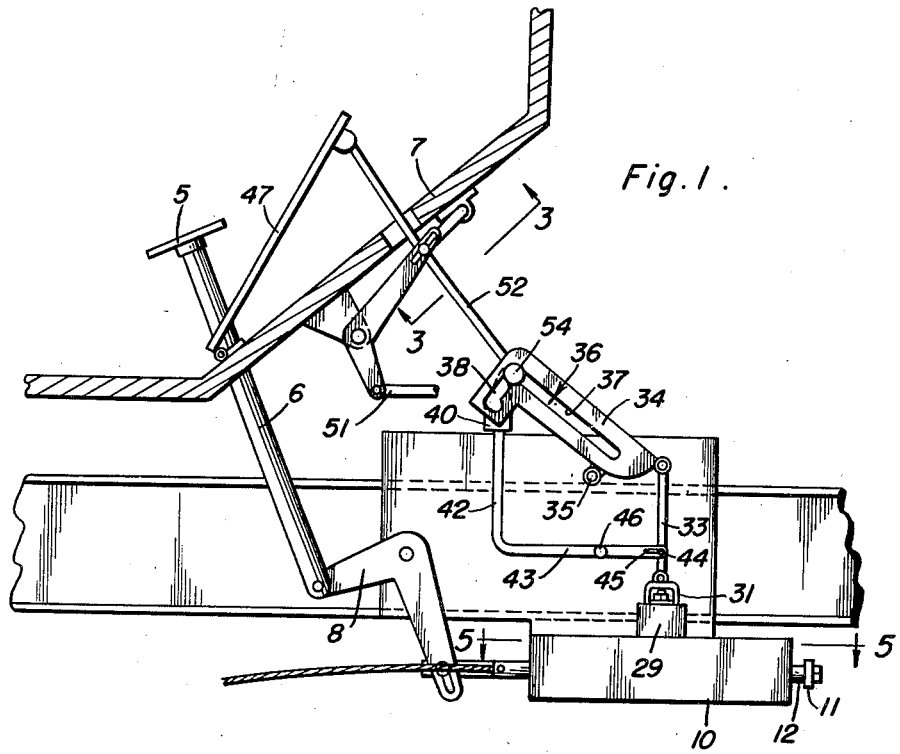
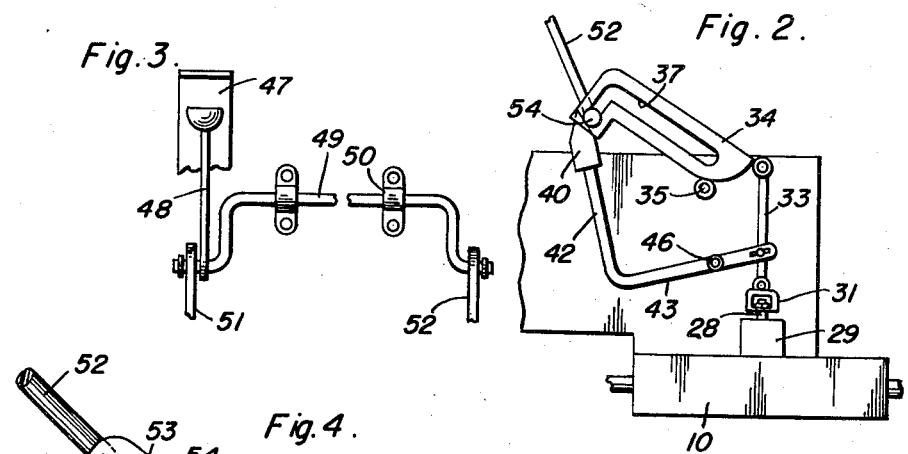
Inventor
Robert M. Huey
By Clarence A. O'Brien
and Harvey B. Jacobson
Attorneys May 8, 1951 R. M. HUEY 2,551,743
AUTOMATIC EMERGENCY BRAKE RELEASE FOR MOTOR VEHICLES
Filed March 4, 1948 2 Sheets-Sheet 2

Inventor
Robert M. Huey
By Clarence A. O'Brien
and Harvey B. Jacobson
Attorneys

Patented May 8, 1951

2,551,743

UNITED STATES PATENT OFFICE 2,551,743

AUTOMATIC EMERGENCY BRAKE RELEASE FOR MOTOR VEHICLES

Robert M. Huey, Lisbon, Iowa

Application March 4, 1948, Serial No. 12,933

4 Claims. (Cl. 192—3)

1

The present invention relates to new and useful improvements in an automatic emergency brake release for motor vehicles.

An important object of the invention is to provide mechanism connecting the emergency brake of a motor vehicle with the accelerator pedal whereby the brake is automatically released by depressing the accelerator pedal to prevent running of the vehicle when the brake is applied and thus prevent undue wear on the brakes or damage to the braking system.

A further object of the invention is to eliminate the necessity of the driver of the vehicle from releasing the emergency brake by hand.

A further object of the invention is to provide an automatic emergency brake releasing mechanism including a dash-pot to retard the brake releasing movement to prevent sudden releasing movement of the brake and brake pedal and thus avoid possible damage thereto.

A still further object is to provide an apparatus of this character of simple and practical construction, which is efficient and reliable in operation, relatively inexpensive to manufacture and install in operative position on the vehicle and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the emergency brake releasing mechanism showing the brake in its released position and the parts shown in section.

Figure 2 is a fragmentary side elevational view showing the brake locked in its applied position.

Figure 3 is a fragmentary sectional view taken substantially on a line 3—3 of Figure 1 and showing the crank connecting the accelerator pedal with the brake releasing mechanism.

Figure 4 is an enlarged fragmentary perspective view of the slotted locking guide for the brake.

Figure 5:
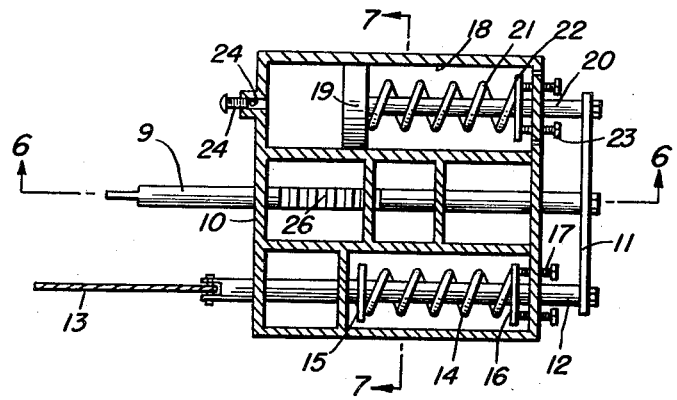
Figure 5 is a longitudinal sectional view of the brake locking and dash-pot housing, taken substantially on a line 5—5 of Figure 1.
Figure 6:
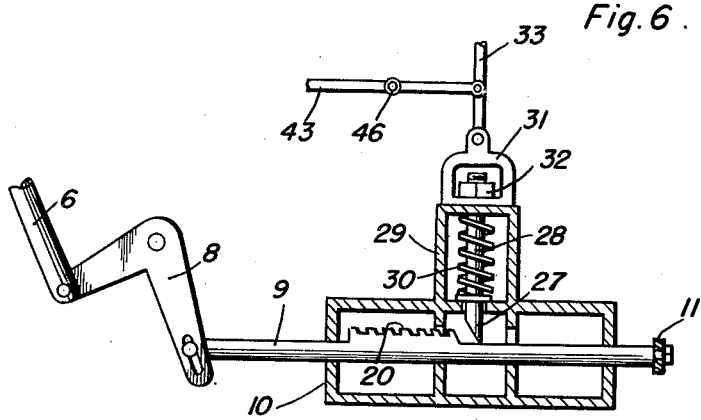
Figure 6 is a longitudinal sectional view taken substantially on a line 6—6 of Figure 5.
Figure 7:
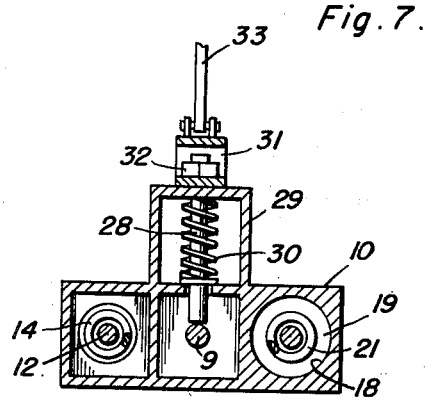
Figure 7 is a transverse sectional view taken substantially on a line 7—7 of Figure 5.

Referring now to the drawings in detail wherein for the purpose of illustration I have disclosed a preferred embodiment of the invention the numeral 5 designates an emergency brake pedal suitably secured to the upper end of a vertically slidable brake operating rod 6 mounted in the floorboard 7 of a motor vehicle. The lower end of rod 6 is pivoted to one end of a pivoted bellcrank lever 8 which has its other end pivoted to the rear end of a brake locking bar 9 slidable longitudinally in a combined locking bar and dash-pot housing 10 suitably secured under the flooring of the vehicle.

The locking bar 9 is slidable substantially at the central portion of the housing 10 and extends entirely therethrough and secured at its front end to the central portion of a cross-bar 11 and to one end of which a brake operating rod 12 is secured and which is also slidable in the housing 10 in a position parallel to the locking bar 9. An emergency brake operating cable 13 is attached to the rear end of rod 12 to apply the emergency brake by a forward motion of rod 12. A coil spring 14 surrounds the rod 12 within housing 10, the rear end of the spring bearing against a washer 15 fixed to the rod 12 and the front end of the spring bearing against an adjustable stop 16 engaged by adjusting screw 17 to adjust the tension of the spring.

A dash-pot cylinder 18 is formed in the opposite side of housing 10 and includes a piston 19 working therein and a piston rod 20 extending forwardly through the front end of housing 10 and attached to the opposite end of the cross-bar 11. A coil spring 21 is mounted on piston rod 20 within the cylinder with one end bearing against the piston and its other end bearing against an adjustable stop 22 engaging adjusting screws 23 to adjust the tension of spring 21.

The rear end of cylinder 18 is provided with a vent 24 provided with a regulating screw 25.

The locking bar 9 is provided with rack teeth 26 extending upwardly therefrom engageable by the lower bevelled end 27 of a locking bolt 28 slidable vertically in a cage 29 on top of the housing 10. A coil spring 30 holds the locking bolt 28 downwardly in locking engagement with the teeth 26 to lock the brake in its applied position.

A connector 31 is adjustably secured to the upper end of bolt 28 by a nut 32 and a link 33 is pivoted at its lower end to the connector and extends upwardly therefrom for pivotally connecting at its upper end to the lower end of a rearwardly inclined slotted guide 34 which is pivoted adjacent its lower end to a part of the vehicle as shown at 35 for vertical rocking movement solely.

The guide 34 is formed with an L-shaped slot 36 including a longitudinally extending long slot 37 communicating at its upper end with a short lateral end slot 38. The end of the guide 34 provided with the lateral locking slot 38 is bifurcated as shown at 39 and in which a bevelled head 40 is positioned for free vertical movement, the head being suitably secured to the upper end of an L-shaped lever 42 which includes a horizontal portion 43 at its lower end pivoted at its extremity to the lower portion of link 33 by means of a pin 44 working in a slot 45 in the lever. The horizontal portion 43 of the lever is pivoted to a part of the vehicle rearwardly of link 33 by a pin or the like 46.

The accelerator pedal for the vehicle is shown at 47 with an accelerator rod 48 extending downwardly therefrom and pivoted to one end of a substantially U-shaped crank 49 having its central portion rockably supported in bearings 50 secured to the underside of floorboard 7. The engine throttle rod 51 is also suitably connected to the end of the crank 49 adjacent rod 48.

A link 52 is pivoted at its upper end to the opposite end of crank 49 and is formed with an angular lower end 53 working in slot 36 and held therein by a head 54 suitably secured to the lower end of the link.

In the operation of the device, the emergency brake is applied by depressing the brake pedal 5 which pushes rod 9 forwardly carrying with it brake applying rod 12 to which the brake cable 13 is attached and the piston rod 20 for the dash-pot cylinder 19. The rack teeth 26 on rod 9 ride under the locking bolt 28 to lock the rod in its brake applying position.

The bolt 28 is raised during its locking movement by the teeth 26 of bar 9 whereby to move link 33 upwardly to cause a raising movement of the front ends of guide 34 and lever 42 with a consequent lowering movement of the rear ends thereof. The lever 42 is pivoted on its pin 46 forwardly of the pivot 35 for guide 34 whereby the rear upper end of lever 42 moves downwardly, as shown in Figure 2, a greater distance than the rear end of guide 34 to lower the bevelled head 40 to a point permitting the angular end 53 of link 52 to drop, under the influence of gravity into the lateral slot 38 of the guide 34, thus locking the link 52, and consequently the accelerator pedal 47 to the guide 34 with the brake locked in applied position.

With the guide 34 link 52 and lever 42 being placed in the position described in the foregoing paragraph, when accelerator pedal 47 is depressed during initial running of the car, link 52 is moved downwardly endwise which slightly lowers rear ends of guide 34 and lever 42 and raises link 33 to release bolt 28 from teeth 20, whereupon springs 14 and 21 slide rods 9, 12 and 20 rearwardly to release the brake and move the teeth 26 clear of the bolt 28. Dash-pot piston 19 regulates the speed of the brake releasing movement to eliminate sudden shocks or jolts to the mechanism.

After rack teeth 26 have cleared the bolt 28, the accelerator pedal 47 may be momentarily released, whereupon the spring 30 will lower the bolt in front of the teeth which lowers the front end of guide 34 and the front end of the horizontal portion of lever 42 and raises the rear ends of said lever and guide 34, the lever 42 having a greater raising movement at its rear end by reason of its shorter front end whereby the head 40 thus raises end 53 of link 52 from the lateral slot 38, into the longitudinal slot 37 for free movement therein as shown in Figure 1, and to permit further unrestricted depressing movement of the accelerator pedal.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention it is to be understood that minor changes in the details of construction, combination and arrangement of parts may be resorted to without departing from the spirit and scope of the invention as claimed.

Having described the invention what is claimed as new is:

1. Automatic brake releasing mechanism including an elongated brake locking and releasing member endwise movable in one direction from an idle position for subsequent operation in an opposite direction to lock the brake, said member being movable in said opposite direction into idle position upon release of the brake, spring means for operating said member to lock the brake and for moving said member into idle position, a pedal, and means operative by movement of said member from idle position to connect said pedal to said member for brake releasing operation of said member by said pedal, said means being operative by movement of said member into idle position to disconnect said pedal and member after release of the brake.

2. An automatic emergency brake release comprising in combination, a brake pedal, a sliding brake applying bar operated by said pedal, a locking bolt movable from a normal position by sliding of said bar to be engaged with and lock said bar in brake applying position and being operative to lock said bar and then be returned to normal position, spring means for operating said bolt to engage and lock the bar and to return said bar to normal position, a rocker member having a long slot with a short lateral end slot therein, an accelerator pedal, a linkage connecting said accelerator pedal to said member with one end of said linkage locked in said short slot when said bolt is engaged with said bar and said bar locked, whereby operation of said accelerator pedal will rock said member, a link connecting said member to said bolt for operating the bolt to unlock the bar when said member is rocked, and means operative by said link upon return of said bolt to normal position to unlock said end of said linkage, said end of the linkage when unlocked being freely movable in said long slot whereby said accelerator pedal may be operated without rocking said rockable member.

3. An automatic emergency brake release according to claim 2, wherein said last means comprises a pivoted lever pivotally connected to said link and engaging said end of said linkage.

4. An automatic emergency brake release according to claim 2, wherein spring means is provided for sliding said brake applying bar out of brake applying position and a dash-pot is provided for retarding sliding of said brake applying bar out of brake applying position.

ROBERT M. HUEY.

(References on following page)

REFERENCES CITED

The following references are of record in the file of this patent:

UNITED STATES PATENTS

| Number | Name | Date |
|---|---|---|
| 1,654,321 | Collins | Dec. 27, 1927 |
| 1,696,702 | Watlington | Dec. 25, 1928 |
| 1,876,498 | Hawkins | Sept. 6, 1932 |
| 1,927,209 | Gilmore | Sept. 19, 1933 |
| 2,010,628 | Duecy | Aug. 6, 1935 |
| 2,072,666 | Cartwright | Mar. 2, 1937 |
| 2,140,780 | DuCharme | Dec. 20, 1938 |
| 2,334,611 | Darling | Nov. 16, 1943 |
| 2,388,002 | Maiwald | Oct. 30, 1945 |
| 2,411,632 | Moran | Nov. 26, 1946 |
| 2,477,865 | DuCharme | Aug. 2, 1949 |